United States Patent [19]
Daniels et al.

[11] Patent Number: 4,690,524
[45] Date of Patent: Sep. 1, 1987

[54] MULTIFOCAL SPECTACLE LENS HAVING A LARGE NEAR-VISION PART

[75] Inventors: Erwin J. Daniels, Aalen; Siegfried Korn, Oberkochen, both of Fed. Rep. of Germany

[73] Assignee: Carl-Zeiss-Stiftung, Heidenheim, Fed. Rep. of Germany

[21] Appl. No.: 700,392

[22] Filed: Feb. 11, 1985

[30] Foreign Application Priority Data

Feb. 17, 1984 [DE] Fed. Rep. of Germany ... 8404836[U]

[51] Int. Cl.$^4$ .................................................. G02C 7/06
[52] U.S. Cl. .................................... 351/168; 351/171; 351/172
[58] Field of Search ................................. 351/168–172

[56] References Cited

U.S. PATENT DOCUMENTS 1,990,126 2/1935 Laabs .................................... 351/172
2,163,130 6/1939 Pellow .................................... 351/172

FOREIGN PATENT DOCUMENTS 122363 1/1919 United Kingdom ................ 351/168

OTHER PUBLICATIONS

Kozol, F.; "The History, Theory and Application of Multifocal Lenses—XIII"; *Optical Journal & Rev. of Optometry;* vol. 100, No. 7; Apr. 1, 1963; pp. 27–31.

*Primary Examiner*—John K. Corbin
*Assistant Examiner*—Scott J. Sugarman
*Attorney, Agent, or Firm*—Walter Ottesen

[57] ABSTRACT

The invention is directed to a multifocal spectacle lens having an especially large near-vision part. A supplementary component is fused into a base dimensioned for the near-vision range. The supplementary part is for at least one distance-vision range. In this connection, it is especially advantageous to select the refractive index of the base to be greater than the refractive index of the supplementary component. Compared to known multifocal lenses made in one piece, the multifocal lens of the invention avoids steps or substantial image jumps between the near-vision and distant-vision regions. For shortsighted wearers of spectacles, the lenses are thinner and therefore lighter.

11 Claims, 6 Drawing Figures

MULTIFOCAL SPECTACLE LENS HAVING A LARGE NEAR-VISION PART

BACKGROUND OF THE INVENTION

There are activities for which spectacle lenses having an especially large near-vision or reading part are advantageous or are required. This applies, for example, to a work location with which there is associated an image screen or for the activity associated with cash registers. Even for work at a desk, some persons wearing spectacles desire an especially large reading part so that they can view an entire A4 sheet of paper without changing the position of the head.

Multifocal spectacle lenses with a large reading part and made from one piece are known wherein the material can be glass or plastic. Such lenses have either a step or a considerable image jump between the reading part and the distance-vision or distance part because of the different radii of curvature for the reading and distance parts. The step is undesirable when cleaning the spectacles and the jump of the image is unpleasant when wearing the same.

SUMMARY OF THE INVENTION

It is therefore an object of the invention to provide a spectacle lens with a large reading part which has no step and no substantial image jump between the reading and the distance-vision regions thereof.

The spectacle lens of the invention includes a base dimensioned for reading and a supplementary component. According to a feature of the invention, the supplementary component is fused into the base and, within the region of the supplementary component, both the base and the supplementary component are dimensioned for the distance-vision region.

In an especially advantageous embodiment of the invention, the refractive index of the base is selected to be larger than the refractive index of the supplementary component. In this way, it is achieved that the supplementary component takes on the form of a collective lens notwithstanding its subtractive action. By making a suitable selection of material and fusion radius of the supplementary component, it is achieved that the radii of curvature of the base and supplementary component lying on the outside are the same. To prevent or reduce image jumps, the linear boundary of the vision regions is positioned so as to pass through the center of the supplementary component or through points lying close to the center.

Such spectacle lenses are especially advantageous for shortsighted persons since the base has a lower refractive index and is therefore lighter and thinner as compared to the conventional multifocal spectacle lenses.

The supplementary component can consist either of a supplementary lens for the distance-vision range only or of a supplementary lens for the distance-vision range and a supplementary lens for the intermediate-vision range.

BRIEF DESCRIPTION OF THE DRAWING

The invention will now be explained with reference to the drawing wherein:

FIG. 1b is a section view taken along line Ib—Ib of FIG. 1a;

FIG. 2b is a section view taken along line IIb—IIb of FIG. 2a;

FIG. 3a is a plan view of a spectacle lens with a first supplementary lens for the distance-vision range and a second supplementary lens for the intermediate-vision range; and, FIG. 3b is a section view taken along line IIIb—IIIb of FIG. 3a.

DESCRIPTION OF THE PREFERRED EMBODIMENTS OF THE INVENTION

Figure 1A:
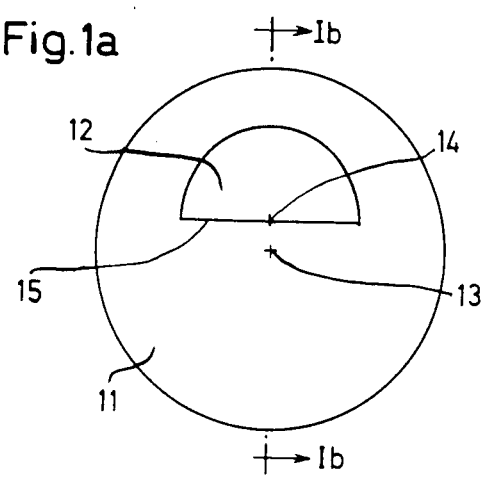
FIG. 1a is a plan view of a spectacle lens having a semicircular supplementary lens for distance vision.
Figure 1B:
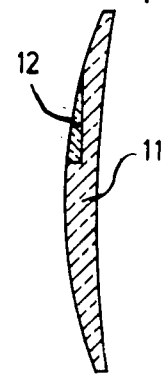

In FIGS. 1a and 1b, reference numeral 11 indicates the base which is dimensioned for the reading distance. The supplementary lens 12 is fused into the base 11 utilizing known techniques. In all of the illustrated embodiments, the supplementary lens 12 is made of a glass having a refractive index less than the refractive index of the base. Accordingly, SF 64 type glass can be utilized for the base in FIGS. 1 and 2 and glass type B 270 can be used for the supplementary lens. The supplementary lens 12 for the distance-vision range and the base 11 conjointly effect the distance correction for the distance vision within the region of the supplementary lens 12. The partition line 15 between the base 11 and the supplementary lens 12 extends through the circular center 14 of the supplementary lens 12 so that no image jump occurs between the reading-vision region and the distance-vision region. If the reading part of the spectacle lens is to be as large as possible, it is advantageous not to place the partition line 15 so that it lies on center point 13 of the base; rather, the partion line 15 should, for example, be placed 5 mm higher.

Figure 2A:
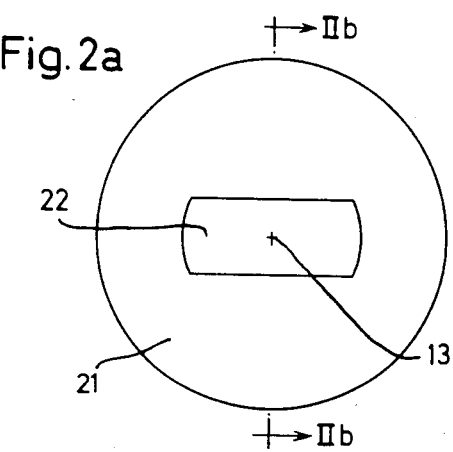
FIG. 2a is a plan view of a spectacle lens having a supplementary lens for distance vision wherein the supplementary lens is configured as a strip of a circle.
Figure 2B:
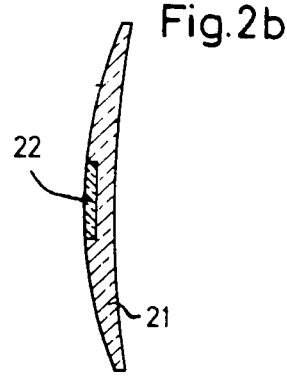

In FIGS. 2a and 2b, a supplementary lens 22 for the distance-vision range is fused into the base 21 dimensioned for the reading-vision range. The supplementary lens 22 is configured as a circular strip and the center thereof is coincident with the center 13 of the base. In this way, the spectacle lens has a large reading portion also in the upper portion thereof. This embodiment is advantageous for a person wearing spectacles who also must look upwardly to short distances and must see clearly notwithstanding poor accommodation capability such as librarians, electricians and auto mechanics.

Figure 3A:
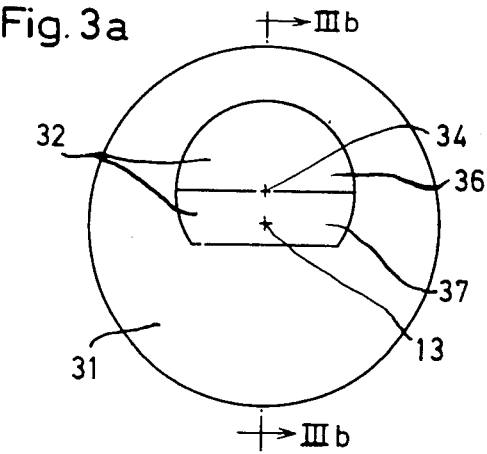
Figure 3B:
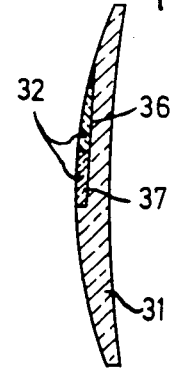

In the embodiments of FIGS. 3a and 3b, the supplementary component 32 is made up of a first supplementary lens 36 for the distance-vision range and a second supplementary lens 37 for the intermediate-vision range, that is, for the central range between reading and distance. This embodiment is especially advantageous for persons having a very low residual accommodative capability. The refraction index of the supplementary lens 37 lies between that of the first supplementary lens 36 and the base 31.

The following table provides several dimensional examples. In this connection, the base for the reading-vision range is made of glass type SF 64 ($n = 1.706$), the first supplementary lens for the distance-vision range is made of glass type B 270 ($n = 1.525$) and the second supplementary lens for the intermediate-vision range is made of glass type BaF 52 ($n = 1.612$). The base or base part has a diameter of 66 mm and the supplementary component has a diameter of 32 mm. The refractive power for the base part, the distance part and the intermediate part are given in diopters. All other data is in millimeters. $R_1$ is the radius of the side of the base facing away from the eye, $R_2$ is the radius of the side of the base facing toward the eye and $R_3$ is the inner radius of the supplementary component, that is, the fusion radius. A negative value of $R_3$ means an opposed bending to $R_1$ and $R_2$. $D_M$ is the center thickness of the base part and $D_Z$ is the center thickness of the supplementary part.

| Base Part | $R_1$ | $R_2$ | $D_M$ | Distance Part | Intermediate Part | $R_3$ | $D_Z$ |
|---|---|---|---|---|---|---|---|
| −3.0 | 140 | 87.5 | 1.2 | −4.5 | −3.78 | −874 | 1.1 |
| −3.0 | 140 | 87.5 | 1.5 | −5.0 | −4.04 | −256 | 1.4 |
| ±0.0 | 106 | 105 | 1.8 | −1.5 | −0.78 | 872 | 1.1 |
| ±0.0 | 106 | 105 | 1.8 | −2.0 | −1.04 | −619 | 1.4 |
| +3.0 | 82 | 123.5 | 3.2 | +1.5 | +2.22 | 256 | 1.1 |
| +3.0 | 82 | 123.5 | 3.2 | +1.0 | +1.96 | 873 | 1.4 |

It is understood that the foregoing description is that of the preferred embodiments of the invention and that various changes and modifications may be made thereto without departing from the spirit and scope of the invention as defined in the appended claims.

What is claimed is:

1. A multifocal spectacle lens having a large near-vision part, the spectacle lens comprising:
    a base lens dimensioned for the near-vision range, said base lens having an outer surface facing objects to be viewed and having a recess formed in said outer surface;
    a supplementary lens seated in said recess so as to be in juxtaposition with said base lens to form a composite lens defining a predetermined region of said spectacle lens for a distance-vision range thereof; and,
    said base lens having an index of refraction greater than the index of refraction of said supplementary lens thereby causing said composite lens to have a refractive power less than the remainder of said base lens outside of said predetermined region.

2. The multifocal spectacle lens of claim 1, said supplementary component being a supplementary lens for the distant-vision range of said spectacle lens.

3. The multifocal spectacle lens of claim 2, said supplementary lens for said distant-vision range being of semicircular configuration.

4. The multifocal spectacle lens of claim 3, said supplementary lens being disposed in said base so as to cause the center of said supplementary lens to lie above the center of said base.

5. The multifocal spectacle lens of claim 2, said supplementary lens being configured so as to have the shape of a strip of a circle.

6. The multifocal spectacle lens of claim 5, said supplementary lens being disposed in said base so as to cause the center of said supplementary lens to be at or near the center of said base.

7. The multifocal spectacle lens of claim 1, said supplementary component being configured to define two predetermined regions for two respectively different distance-vision ranges.

8. The multifocal spectacle lens of claim 1, said supplementary component consisting of a first component lens fused into said base and defining a first predetermined region for a distant-vision range and a second component lens fused into said base and defining a second predetermined region for an intermediate-vision range between said distant-vision range and said near-vision range.

9. The multifocal spectacle lens of claim 8, said first component lens being configured so as to have the shape of a semicircle and said second component lens being configured so as to have the shape of a strip of a circle.

10. The multifocal spectacle lens of claim 9, said first component lens being disposed in said base so as to cause the center point thereof to be above the center point of said base and said second component lens being disposed in said base so as to cause the center point thereof to lie at or near the center point of said base.

11. A multifocal spectacle lens having a large near-vision part, the spectacle lens comprising:
    a base lens dimensioned for the near-vision range and having two surfaces through which light passes from the object being viewed to the viewer, said base lens having a recess formed in one of said surfaces;
    a supplementary lens seated in said recess so as to be in juxtaposition with said base lens to form a composite lens defining a predetermined region of said spectacle lens for a distance-vision range thereof; and,
    said base lens having an index of refraction greater than the index of refraction of said supplementary lens thereby causing said composite lens to have a refractive power less than the remainder of said base lens outside of said predetermined region.

* * * * *